US008280813B2

(12) United States Patent
Bohn

(10) Patent No.: US 8,280,813 B2
(45) Date of Patent: Oct. 2, 2012

(54) SYSTEM AND METHOD FOR PROVIDING DEBT PROTECTION FOR FINANCIAL OVERDRAFT ACCOUNT

(75) Inventor: William M. Bohn, Menasha, WI (US)

(73) Assignee: Associated Banc-Corp., Green Bay, WI (US)

( * ) Notice: Subject to any disclaimer, the term of this patent is extended or adjusted under 35 U.S.C. 154(b) by 276 days.

(21) Appl. No.: 12/887,132

(22) Filed: Sep. 21, 2010

(65) Prior Publication Data
US 2012/0072342 A1    Mar. 22, 2012

(51) Int. Cl.
*G06Q 40/00* (2012.01)
(52) U.S. Cl. ............................................. 705/40; 705/4
(58) Field of Classification Search ........................ 705/4
See application file for complete search history.

(56) References Cited

U.S. PATENT DOCUMENTS

| | | | |
|---|---|---|---|
| 6,315,196 B1 | 11/2001 | Bachman | |
| 7,182,253 B1 | 2/2007 | Long | |
| 7,533,803 B2 | 5/2009 | Long, Sr. | |
| 7,680,734 B1* | 3/2010 | Bent et al. | 705/40 |
| 2004/0193537 A1* | 9/2004 | Knapp | 705/39 |
| 2004/0254878 A1 | 12/2004 | Fitzsimmons et al. | |
| 2005/0289044 A1 | 12/2005 | Breslin et al. | |
| 2006/0059085 A1* | 3/2006 | Tucker | 705/38 |
| 2006/0116903 A1 | 6/2006 | Becerra | |
| 2006/0155590 A1 | 7/2006 | Graham | |
| 2010/0023354 A1 | 1/2010 | Gore et al. | |
| 2010/0070308 A1 | 3/2010 | Long, Sr. | |
| 2010/0100400 A1 | 4/2010 | Becerra | |
| 2011/0125643 A1* | 5/2011 | Cameo et al. | 705/44 |
| 2011/0225084 A1* | 9/2011 | Holt | 705/38 |

OTHER PUBLICATIONS

Financial Institutions Using COPS Overdraft Processing Solution are Compliant with New Federal Recommendations Business Wire. New York: Jul. 21, 2004. p. 1.*
Robbery in the '90s: Banks Steal From the Poor; [Five Star Lift Edition] Mary Ann McGivern. St. Louis Post-Dispatch. St. Louis, Mo.: Apr. 27, 1999. p. B.13.*

* cited by examiner

*Primary Examiner* — William Rankins
(74) *Attorney, Agent, or Firm* — Reinhart Boerner Van Deuren s.c.

(57) ABSTRACT

A system and method that provides an enhancement to an overdraft protection program at a financial institution. The debt protection of the program is funded by the financial institution rather than by a consumer/user of the financial account at the financial institution. Under the debt protection program, if the consumer dies, becomes disabled, or becomes involuntarily unemployed and such facts are established to a reasonable degree, the debt protection program will automatically repay the overdraft in full including cost and fees up to a predetermined maximum amount. The payment can occur in a single payment or over a period of time, for example monthly, until the predetermined maximum amount is reached.

31 Claims, 4 Drawing Sheets

SYSTEM AND METHOD FOR PROVIDING DEBT PROTECTION FOR FINANCIAL OVERDRAFT ACCOUNT

BACKGROUND OF THE INVENTION

Field of the Invention

This disclosure relates generally to financial accounts at a financial institution and more particularly to a system and method for providing debt protection for financial overdrafts of selected accounts at that financial institution.

Overdraft protection has been provided to consumers in conjunction with consumer financial accounts. For example, when a consumer writes a check, pays by debit card, or withdraws money at an automatic teller machine (ATM), if the consumer's financial account does not have sufficient funds, an overdraft protection facility will operate in order to automatically provide additional funds, typically up to a predetermined limit, in the form of a short-term "loan." The consumer is charged for this service, with such charges potentially including one or more of an annual overdraft protection program fee, a fixed fee for each overdraft, and an interest rate which may be higher than a conventional loan interest rate. The repayment of the overdraft protection "loan" may be automatic on the deposit of additional funds into the consumer's financial account, or it may instead require the consumer to take action to repay the "loan" plus the overdraft fee and interest, or funds from another account owned by the consumer at the financial institution are automatically transferred to the overdrawn account in accord with the financial institution's contracts with the consumer.

In some instances the consumer is now in a position to repay the overdraft protection "loan" extended by the financial institution because of circumstances not completely in control of the consumer. For example, the consumer may have experienced a job loss, died, or became disabled. In such circumstances, the financial institution may be "stuck" with the amount of the overdraft "loan."

SUMMARY OF THE INVENTION

The disadvantages and limitations of the background art discussed above are overcome by the present disclosure.

There is provided a system of providing overdraft protection for financial accounts. The system includes a computer readable financial institution database configured to store financial account data for at least one financial account of at least one user at a financial institution. A financial institution computer processor is coupled to the financial institution database. The financial institution computer processor is configured to update and maintain financial account records stored in said financial institution database for the at least one financial account of the at least one user at the financial institution. The financial institution computer processor updates and maintains at least one overdraft account linked to the at least one financial account of the at least one user at the financial institution.

The financial institution computer processor receives information establishing an occurrence of one of a selected plurality of adverse events that have been experienced by the user and, based upon the receipt of the experience by the user of the occurrence of one of the selected plurality of adverse events, the computer processor generates an adverse event occurrence signal. A computer readable debt protection program database is configured to store debt protection account data for the at least one financial account of the at least one user at the financial institution.

A debt protection program processor is coupled to the debt protection program database. The debt protection program processor is configured to receive information from the financial institution computer processor regarding the overdraft account linked to the at least one financial account of the at least one user at the financial institution. The debt protection program processor received payment from the financial institution for the overdraft protection of the at least one overdraft account linked to the at least one financial account of the at least one user at the financial institution.

The debt protection program processor also receives the adverse event occurrence signal from the financial institution computer processor regarding the experience by the user of the occurrence of one of the selected plurality of adverse events and in response to receipt of the event occurrence signal from the financial institution computer processor, sends at least one payment to the financial institution to be credited to the at least one overdraft account linked to the at least one financial account of the at least one user at the financial institution. The one of the selected plurality of adverse events for which an adverse event occurrence signal is generated is one of a group consisting of involuntary loss of a job, death, and a qualified disability of the user.

There is also provided a method of providing overdraft protection for financial accounts. The method includes providing a computer readable financial institution database configured to store financial account data for at least one financial account of at least one user at a financial institution providing a financial institution computer processor coupled to the financial institution database. The financial institution computer processor is configured for updating and maintaining financial account records stored in said financial institution database for the at least one financial account of the at least one user at the financial institution. The financial institution computer processor is also configured for updating and maintaining at least one overdraft account linked to the at least one financial account of the at least one user at the financial institution.

The financial institution computer processor is also configured for receiving information establishing occurrence of one of a selected plurality of adverse events that have been experienced by the user and based upon the receipt of the experience by the user of the occurrence of one of a selected plurality of adverse events, generating an adverse event occurrence signal. The financial institution computer processor also provides a computer readable debt protection program database configured to store debt protection account data for the at least one financial account of the at least one user at the financial institution. And providing a debt protection program processor coupled to the debt protection program database.

The debt protection program processor is configured for receiving information from the financial institution computer processor regarding the overdraft account linked to the at least one financial account of the at least one user at the financial institution. It is also configured for receiving payment from the financial institution for the overdraft protection of the at least one overdraft account linked to the at least one financial account of the at least one user at the financial institution. It is also configured for receiving the adverse event occurrence signal from the financial institution computer processor regarding the experience by the user of the occurrence of one of a selected plurality of adverse events, and in response to the receipt of the event occurrence signal from the financial institution computer processor, sending at least one payment to the financial institution to be credited to the at least one overdraft account linked to the at least one financial account of the at least one user at the financial institution.

There is additionally provided a system of providing overdraft protection for financial accounts. The system includes a computer readable financial institution database configured to store financial account data for at least one financial account of at least one user at a financial institution. A financial institution computer processor is coupled to the financial institution database. The financial institution computer processor is configured to update and maintain financial account records stored in said financial institution database for the at least one financial account of the at least one user at the financial institution; update and maintain at least one overdraft account linked to the at least one financial account of the at least one user at the financial institution; receive information from the user establishing an occurrence of one of a selected plurality of adverse events that have been experienced by the user, including a verification of the event; and based upon the receipt of the experience by the user of the occurrence of one of a selected plurality of adverse events, generating an adverse event occurrence signal.

The system further includes a computer readable debt protection program database configured to store debt protection account data for the at least one financial account of the at least one user at the financial institution, and a debt protection program processor coupled to the debt protection program database. The debt protection program processor is configured to receive information from the financial institution computer processor regarding the overdraft account linked to the at least one financial account of the at least one user at the financial institution; receive payment from the financial institution for the overdraft protection of the at least one overdraft account linked to the at least one financial account of the at least user at the financial institution; receive the adverse event occurrence signal from the financial institution computer processor regarding the experience by the user of the occurrence of one of a selected plurality of adverse events; and in response to receipt of the event occurrence signal from the financial institution computer processor, sending at least one payment to the financial institution to be credited to the at least one overdraft account linked to the at least one financial account of the at least one user at the financial institution. The verification of the adverse event is provided to one of the financial institution and a third party administrator of the system. The financial account can be one of a checking account, a debit card account, and a savings account.

Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENTS

Figure 1:
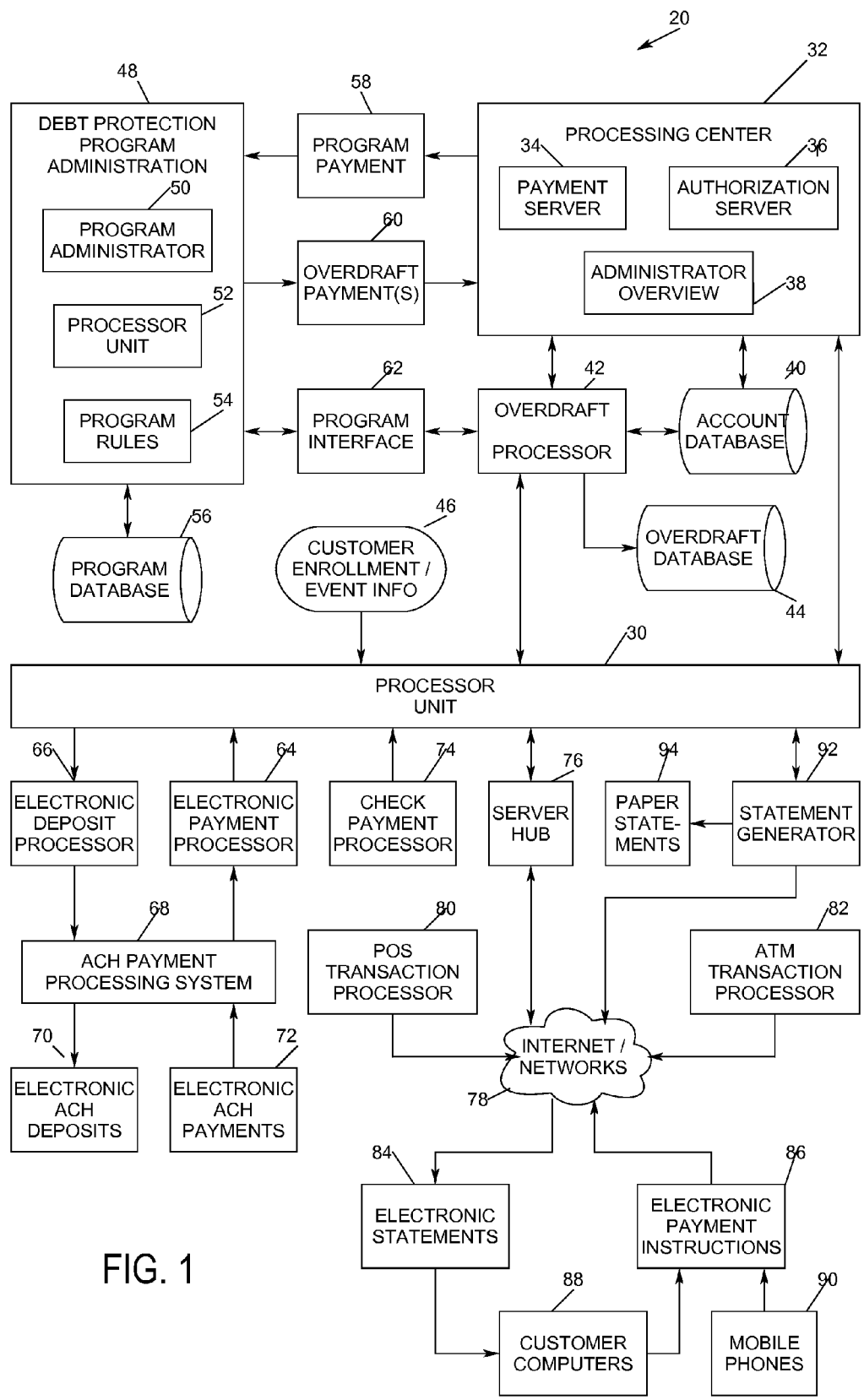
FIG. 1 is a diagram illustrating an exemplary embodiment of a system to provide debt protection for a financial overdraft account established at a financial institution for a consumer financial account.

Referring to the figures, FIG. 1 illustrates an exemplary embodiment of a system 20 to provide a debt protection program 22 for a financial overdraft account 24 associated with a consumer financial account 26 during a period of time. The time period typically is a one month period but it may be any roughly monthly period (typically ending on a weekday rather than on a weekend day) as determined by the financial institution that maintains the account.

A financial institution will maintain the system 20 on a computer system that is either maintained in-house or operated by a third party provider. The financial institution may typically be a bank and the consumer financial account 26 may be, for example, a checking account. The system 20 includes a computer processor 30 which is coupled to a processing center 32. The processing center 22 typically includes a payment server 34, an authorization server 36, and an administrator overview 38. The processing center 32 is coupled to an account database 40 in which the information relating to the consumer financial account 26 for a specific consumer (user) is maintained. The account database 26 is typically a computer readable database configured to store the account data and related information. The processor unit 30 of the system 20 includes a check payment processor 74 which processes paper check deposits made by the user into the consumer financial account 26. The processor unit 30 typically also includes a cash payment processor which processes any cash deposits made by the user to the consumer financial account 26.

The debt protection program 22 is "piggy backed" on the conventional overdraft protection financial product provided by the financial institution. The conventional overdraft protection financial product includes an overdraft processor 42 which monitors and administers the overdraft facility of the financial institution. The overdraft processor includes an overdraft database 44 which maintains and accumulates data on specific overdraft accounts that are associated with a consumer/user's account 26. The overdraft processor 42 also processes the additional debt protection program 22 described herein. The consumer financial account 26 has an associated financial overdraft account 24 with each account maintained in their separate databases, i.e. the overdraft database 44 and the account database 40.

The overdraft processor 42 is coupled to the processing center 32 of the financial institution as well as the processor unit 30. The customer enrollment/event information 46 is maintained by the customer enrollment/event information 46 available to the processing center 32 as well as the overdraft processor 42.

The debt protection program 22, as disclosed in the present application, is maintained in a debt protection program administration 48 facility. The debt protection program administration includes a program administrator 50, a processor unit 52, and program rules 54. Coupled to the debt protection program administration 48 is the program database 56 which maintains the data relating to the debt protection program 22. The program rules 54 set are various rules relating to the debt protection program 22, for example, the maximum benefit amount available for overdraft protection for a specific account, the payment terms to the financial institution, and the various conditions that are applicable to such payments; the types of adverse events that will permit a payment of the debt overdraft protection to the financial institution, and the types of verification information that is required for a specific adverse event. It should be understood that these rule examples are not limiting and that other rules can be implemented by the financial institution and the debt protection program administrator 50 as they see fit and/or agree.

The debt protection program administration is coupled to the processing center 32 of the financial institution by a program interface 62 through the overdraft processor 42. Payments from the debt protection program administration 48 to the financial institution are provided through the overdraft payment facility 60 directly to the financial institution's processing center 32. Payment for the debt protection program 22 which fund the program come from the financial institution through its processing center 32 through a program payment facility 58. It should be understood that the debt protection program administration 48 can be a third party administrator contractually associated with the financial institution or it can be a separate division or section within the financial institution itself. The program interface 62 can be any convenient device and method for communicating and exchanging data between the debt protection program administration 48 and the overdraft processor 42 and their respective associated data bases and processors.

Electronic transactions also referred to as on-line banking transactions are also processed by the processor unit 30. The term "on-line banking" as used herein, encompasses banking services, information, and data. An electronic payment processor 64 is coupled to the processor unit 30 and is in communication with the Automated Clearinghouse Network (ACH) 68 for processing electronic payments 72 made by or on behalf of the user. Such electronic payments 72 may be automatic payments or debits to the consumer financial account 26 or they may be initiated by the user of the consumer financial account 26.

An electronic deposit processor 66 is also coupled to the processor unit 30 of the system 20 and is in communication with the ACH system 68 for handling electronic direct deposits 70. Such electronic direct deposits can be, for example, automatic payroll check deposits. The processor unit is also coupled to a point of sale transaction processor 80 for handling point of sale terminal transactions for example purchases at a vendor, supplier, retail stores, etc. The processor unit 30 is further coupled to an automatic teller machine (ATM) transaction processor 82 which transacts business through automatic teller machine terminals. The user of the consumer financial account 26 can withdraw cash or make deposits at an ATM terminal and have the transaction processed in the processor unit 30.

A check payment processor 74 configured to transact cleared checks is coupled to the processor unit 30. The check payment processor 74 is configured to handle paper checks as well as a check debit card transactions issued by a financial institution or a third party, for example a Visa® check debit card. The check debit card is associated with the consumer financial account 26.

The processor unit 30 is also coupled to a server hub 76, for example an Internet server, which communicates, for example, with a customer computer 88 for making electronic payments 84 through the Internet network 78. The server hub 76 can also facilitate providing E-statements 84 issued by the financial institution through a statement generator 92 coupled to the processor unit 30. Paper statements 94 can also be generated by the statement generator 84 and sent to user. The E-statement 84 can be sent directly to a customer or user's computer 88 via the Internet 78. It should be understood that the server hub 76 can communicate with customers or users connected to the Internet through several different types of Internet services such as provided by AOL®, AT&T®, Verizon®, etc.

The system 20 through its processor unit 30 can also transact business with a mobile server hub coupled to the processor unit 30. The mobile server hub is in communication with a mobile service provider through which a user of a mobile phone 90 can make electronic payments 86 through the mobile service provider and the processor unit 30. It should be understood that a variety of mobile service providers can be coupled to the system 20 as determined by the financial institution in cooperation with users of the consumer financial account 26.

The computer processor unit 30 of the system 20 is coupled to the account database 40. The computer processor unit 30 is configured to establish the user identity in the database 40 and create a financial consumer account 26 for each user in the database 40. It should be understood that the system 20 includes various and typical input devices, such as keyboard, mouse, touchscreen, smart phone and the like either hardwired or wirelessly coupled to the system and further, output devices, such as computer screen, printer, smart phone or the like are also coupled to the system 20.

Figure 2:
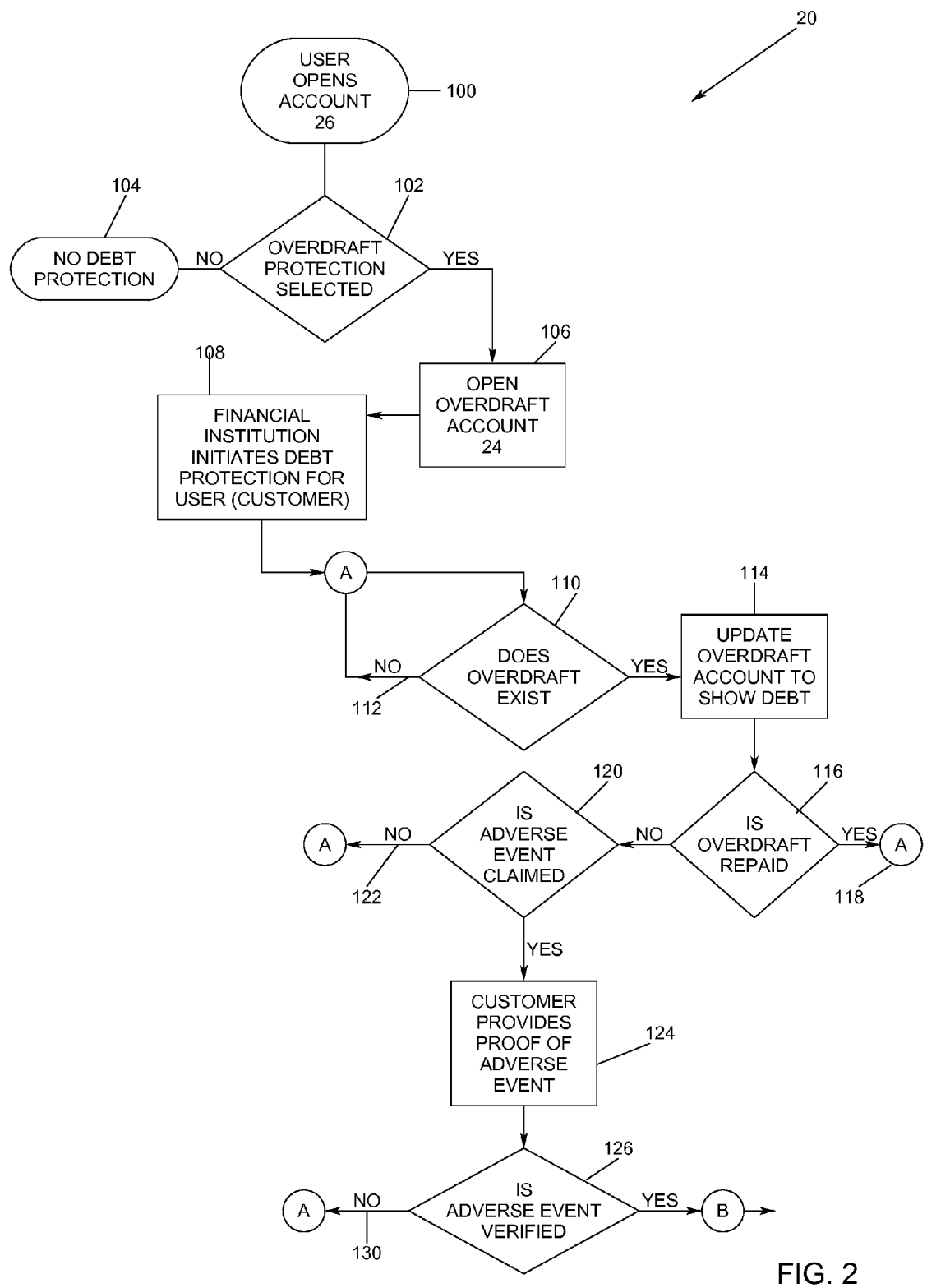
FIG. 2 is flow diagram schematically illustrating an exemplary embodiment of a method of providing overdraft protection for financial accounts at a financial institution with a debt protection program in the event of one of a selective adverse events occurring to the consumer/user of the financial account.
Figure 3:
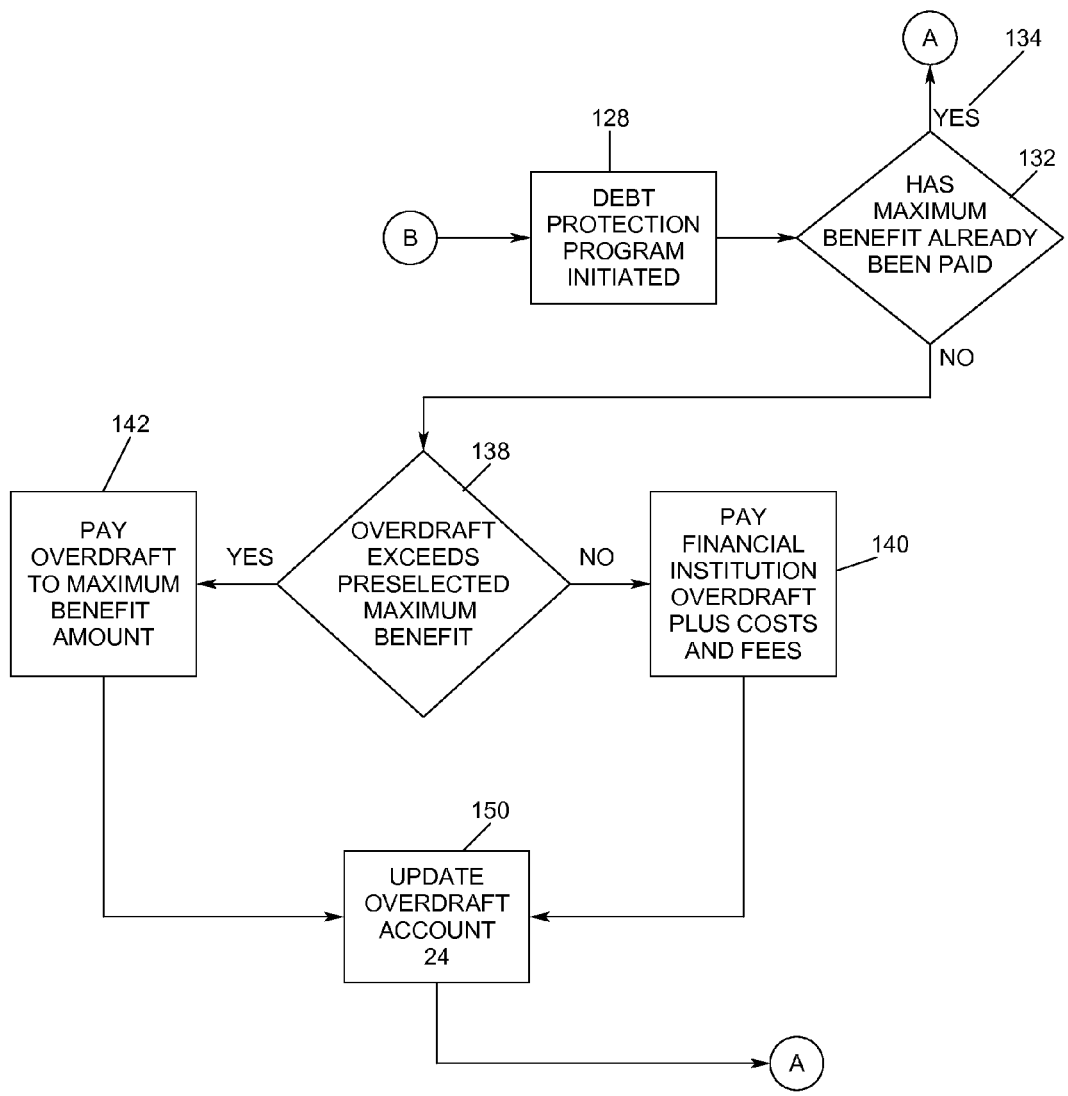
FIG. 3 is a continuation of the flow diagram illustrated in FIG. 2.
Figure 4:
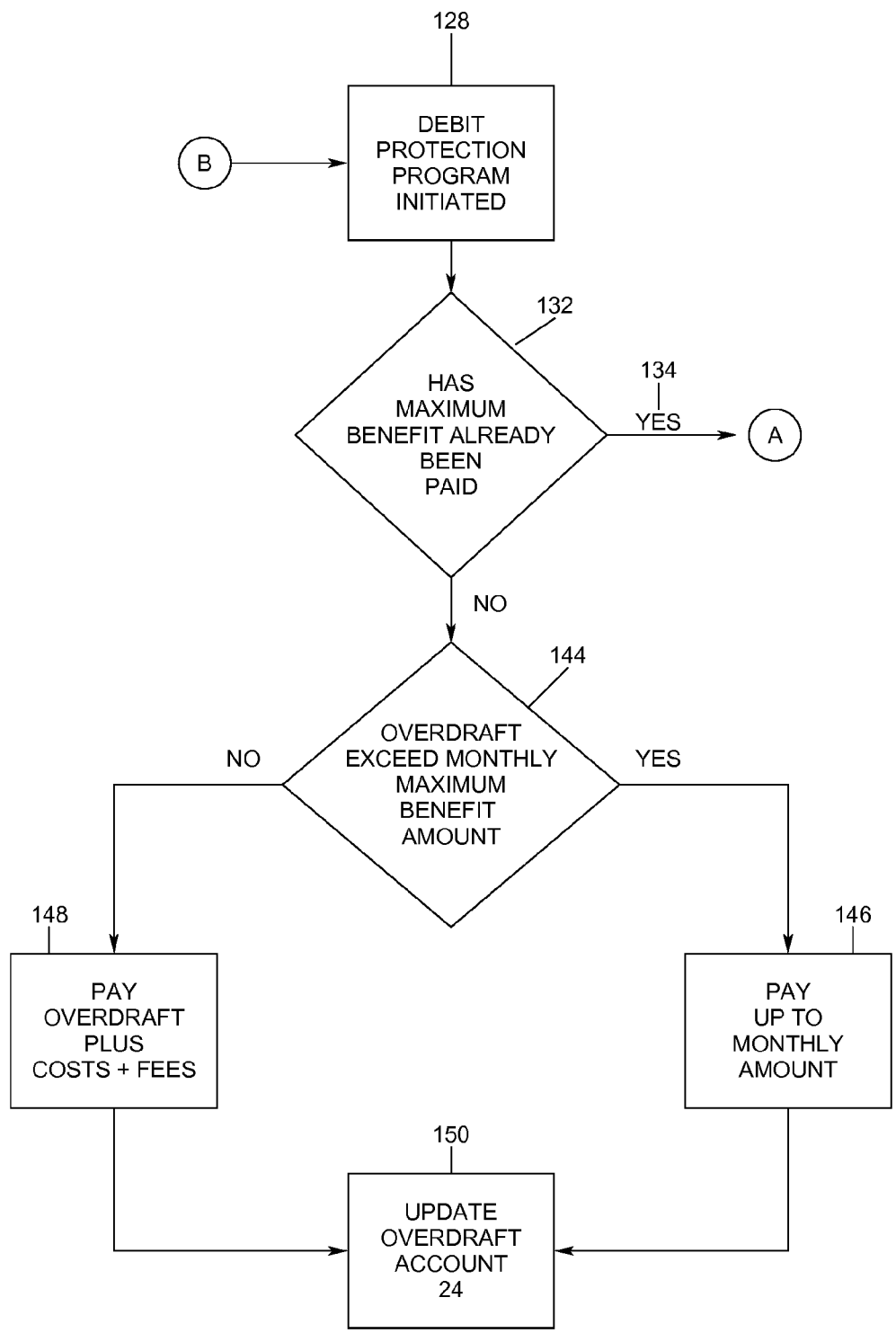
FIG. 4 is an exemplary embodiment of a continuation of the flow diagram illustrated in FIG. 2 with the overdraft protection program making payments to the financial institution over a period of time, for example monthly.

Referring now to FIGS. 2, 3, and 4, FIG. 2 illustrates an exemplary embodiment of a process for providing a debt protection program 22 as part of a conventional overdraft protection product that is provided by a financial institution in conjunction with the consumer financial account 26 at that financial institution.

Typically, a consumer, also referred to as a user, acts to open an account 100 at a financial institution. The account 26 is a checking account, savings account, or a debit card account. A financial institution typically offers overdraft protection. The user has an option of selecting an overdraft protection 102. If the user decides not to enroll in an overdraft protection program, there is no debt protection 104 for an overdraft of the particular account opened by the user. On the other hand, if the user selects an overdraft protection 102 an overdraft account 24 is opened 106.

Overdraft protection has been provided in conjunction with consumer financial accounts and is well known in the financial services industry. When a user writes a check, or pays with a debit card or withdraws money at an automatic teller machine (ATM), if the user's financial account does not have sufficient funds, an overdraft protection, if selected by the user, will operate automatically to provide additional funds to the particular account in the form of a short-term loan to the user of the account. The amount of the short-term loan as maintained in an overdraft account coupled to the particular account of the user. For this short-term loan protection, the user is charged typically with an annual overdraft protection program fee, a fixed fee for each overdraft that occurs, and an interest rate assessed on the short-term loan amount. The specific terms of this overdraft protection program will vary from institution to institution.

Repayment of the overdraft loan can be either an automatic withdrawal from other funds maintained by the user at the financial institution or the overdraft program may require the user to take immediate action to repay the loan together with interest and/or the overdraft fees or such other costs and fees that are part of the program.

Although overdraft circumstances may vary from consumer to consumer, there are certain instances or circumstances in which an overdraft of an account may occur because of an adverse event experienced by the consumer.

The present disclosure provides an enhancement to a typical overdraft protection program. This enhanced overdraft protection or debt protection program 22 is automatically included in an overdraft protection program offered by the financial institution. This debt protection program 22 is automatically included in the overdraft protection program and is funded by the financial institution not by the consumer/user. If the user selects and signs up for the overdraft protection program 102 the enhanced debt protection program 22 will be automatically applicable at the same time. As a part of the debt protection program 22, a predetermined amount as a maximum benefit is set as one of the rules 54 of the debt protection program 22. For example, a maximum amount of a debt protection benefit in an exemplary embodiment is set at five hundred dollars.

The debt protection program 22 will provide, as determined by the financial institution in its rules, that the payment from the debt protection program 22 to the overdraft account 24 is equal to the overdraft amount or the overdraft amount plus an overdraft fee plus interest on the overdraft amount. Other fees and costs may also be changed to the user as determined by the financial institution which may or may not be covered by the debt protection program 22.

It should be understood that the debt protection payment 22 will also include rules as to how many overdrafts will be allowed by the financial institution before the relationship with the user will be terminated or otherwise modified. Further, the debt protection program 22 will also provide that the maximum benefit amount, described above, will be available during a set period of time, for example months, quarterly, or annually. After such time period, if the maximum benefit amount has been applied to the user's account, any further overdrafts will be treated in the usual manner, for example repayment immediately or a notice of insufficient fund, send to the user and payee.

An adverse event experienced by the user can be for example, the user/consumer's death, disability of the consumer, or involuntary unemployment. Any of such adverse events can be a reason for an overdraft of a financial account at a financial institution. In such circumstances, it may be difficult or impossible for the financial institution to recover, from the consumer, the amount of the overdraft loan together with the cost and fees associated with the overdraft account. By providing the debt protection program 22 of the present disclosure, the financial institution can recover all or a portion of the overdraft loan and associated costs and fees from the program rather than from the consumer who experienced the adverse event. As such, the debt protection program 22 is an incentive to the user/consumer to establish a relationship with the financial institution, especially since there is no added cost to the consumer/user for such program.

In operation, if the financial institution has instituted the debt protection program 22 and the consumer has opted into the overdraft protection program, the institute establishes 106 an overdraft account 24 and initiates debt protection 108 for the user/consumer. Through the monitoring of the financial accounts of the user by the processor unit 30, it can be determined if an overdraft exists 110. If no overdraft exists 112, no further action is taken, and the monitoring of the overdraft account 24 is reset. If the answer to the question does an overdraft exist is positive, there is an update to the overdraft account to show the debt 114. In the normal course, the financial institution will query is the overdraft repaid 116.

If the answer is yes, the overdraft account is updated and reset 118 and no further action is required. If the answer to the query is overdraft repaid is no, the system will query is an adverse event claimed 120. If the answer is no 122, the overdraft is treated in a conventional manner and the overdraft account is updated and monitoring is reset. If the answer to a query is an adverse event claimed is positive, the system requires the consumer to provide proof of the adverse event 124. Further query is required as to whether or not the adverse event is verified 126. If the answer to the verification query is no 130 the overdraft is treated in a conventional manner and the overdraft account is updated and the monitoring is reset. If the answer to the query is an adverse event verified is yes, the debt protection program of the present disclosure, is initiated 128.

Verification of the adverse event will vary from the type of event and consumer-to-consumer. For example, an adverse event such as death would typically require a copy of the death certificate, or an adverse event such as a disability would require a statement from an attending physician with perhaps a second opinion. Any such verification requirements would be set forth in the program rules 54 of the debt protection program administration 48 and administered by the program administrator 50. It should be understood that an overdraft of an account must occur before the financial institution is notified of an adverse event.

If the debt protection program is initiated 128, the system determines if the maximum benefit, i.e. the predetermined maximum benefit amount, has already been paid 132 by the debt protection program 22. If the answer to the query has the maximum benefit already been paid the specimen collection head 132 is yes 134, the overdraft account 24 is reset. If the answer to the query has the maximum benefit already been paid 132 is no, the system queries if the overdraft exceeds a preselected maximum benefit 138.

As described above, the predetermined maximum benefit amount can be any amount determined by the financial institution and for example can be five hundred dollars. If the answer to the query does the overdraft exceed preselected maximum benefit 138 is no, the financial institution receives an amount equal to the overdraft plus the cost and fees from the debt protection program 22 at step 140 to the overdraft account 24 associated with the user account 26 maintained by the financial institution and the overdraft account is updated 150.

If the answer to the query does the overdraft exceed the preselected maximum benefit 138 is yes, the debt protection program 22 will make a payment to the financial institution in an amount of the overdraft plus costs and fees up to the maximum benefit amount 142 established in the particular debt protection program. The payment is made to the overdraft account 24 and the overdraft account is updated 150.

In an alternative embodiment (See FIG. 4), if the answer to the query has the maximum benefit already been paid 132 is no, the system will query does the overdraft exceed a monthly maximum benefit amount 144. If the answer to that query 144 is yes, the debt protection program 22 will make a payment to the financial institution up to the predetermined monthly amount 146 to the overdraft account of the financial institution and update the overdraft account 150. If the answer to the query does the overdraft exceed the monthly maximum benefit amount 144 is no, the debt protection program will pay the overdraft plus costs and fees 148 to the financial institution's overdraft account and update the overdraft account 150.

In this latter embodiment, the debt protection program 22 is configured to make the predetermined benefit amount over a period of months, for example, two hundred dollars a month for two and one-half months to a maximum of five hundred dollars. It should be understood that the predetermined maximum benefit amount total and the monthly payment amount can be any value selected by the financial institution at the time of entering into the debt protection program 22 described herein. It should also be understood that the predetermined maximum benefit amounts and payment terms can be changed from time to time as determined by the financial institution.

The debt protection program 22 can be administered by a debt protection program administration 48 under the auspices of a program administrator 50. Such debt protection program administration 48 can be operated by a separate entity that contracts with a particular financial institution to administer and operate the debt protection program 22. It is also contemplated that the financial institution may operate a debt protection program 22 within its own organization with appropriate regulatory safeguards and procedures.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

It may therefore be appreciated from the above detailed description of the exemplary embodiments of the present disclosure that it describes a system and method for providing debt protection for a financial overdraft account.

Although the foregoing description of the present system and method has been shown and described with reference to particular embodiments and applications thereof, it has been presented for purposes of illustration and description and is not intended to be exhaustive or to limit the particular embodiments and applications disclosed. It will be apparent to those having ordinary skill in the art of financial accounts that include providing debt protection for financial overdrafts of certain types of accounts at a financial institution that a number of changes, modifications, variations, or alterations to the system and method as described herein may be made, none of which depart from the spirit or scope of the present disclosure. The particular embodiments and applications were chosen and described to provide the best illustration of the principles of the system and method and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A system of providing overdraft protection for financial accounts, the system comprising:
    a computer readable financial institution database configured to store financial account data for at least one financial account of at least one user at a financial institution;
    a financial institution computer processor coupled to the financial institution database, with the financial institution computer processor being configured to:
        update and maintain financial account records stored in said financial institution database for the at least one financial account of the at least one user at the financial institution;
        update and maintain at least one overdraft account linked to the at least one financial account of the at least one user at the financial institution;
        receive information establishing an occurrence of one of a selected plurality of adverse events that has been experienced by the user; and
        based upon the receipt of the experience by the user of the occurrence of one of a selected plurality of adverse events, generating an adverse event occurrence signal;
    a computer readable debt protection program database configured to store debt protection account data for the at least one financial account of the least one user at the financial institution; and
    a debt protection program processor coupled to the debt protection program database, with the debt protection program processor being configured to:
        receive information from the financial institution computer processor regarding the overdraft account linked to the at least one financial account of the at least one user at the financial institution;
        receive payment from the financial institution for the overdraft protection of the at least one overdraft account linked to the at least one financial account of the at least one user at the financial institution;
        receive the adverse event occurrence signal from the financial institution computer processor regarding the experience by the user of the occurrence of one of a selected plurality of adverse events; and
        in response to receipt of the event occurrence signal from the financial institution computer processor, sending at least one payment to the financial institution to be credited to the at least one overdraft account linked to the at least one financial account of the at least one user at the financial institution.

2. The system of providing overdraft protection for financial accounts of claim 1, wherein the information establishing an occurrence of one of a selected plurality of adverse events that has been experienced by the user is provided by the user.

3. The system of providing overdraft protection for financial accounts of claim 1, further comprising the at least one payment to the financial institution to be credited to the at least one overdraft account not exceed a predetermined amount.

4. The system of providing overdraft protection for financial accounts of claim 3, wherein the predetermined amount is five hundred dollars.

5. The system of providing overdraft protection for financial accounts of claim 3, wherein the at least one payment is based on a monthly schedule.

6. The system of providing overdraft protection for financial accounts of claim 1, further comprising the at least one payment to the financial institution to be credited to the at least one overdraft account is equal to one of an overdraft of the at least one financial account and an overdraft of the at least one financial account plus an overdraft fee plus interest on both the overdraft and the overdraft fee.

7. The system of providing overdraft protection for financial accounts of claim 1, wherein an overdraft of the at least one financial account of the user occurred before the financial institution received information establishing an occurrence of the adverse event by the user.

8. The system of providing overdraft protection for financial accounts of claim 1, wherein the one of the selected plurality of adverse events is one of a group consisting of: involuntary loss of job, death, and qualified disability of the user.

9. The system of providing overdraft protection for financial accounts of claim 8, the information establishing an occurrence of one of a selected plurality of adverse events includes a verification of the event.

10. The system of providing overdraft protection for financial accounts of claim 9, wherein the verification of the event is provided to one of the financial institution and a third party administrator of the system.

11. The system of providing overdraft protection for financial accounts of claim 1, wherein the financial account is one of a checking account, a debit card account, and a savings account.

12. A method of providing overdraft protection for financial accounts, the method comprising:
providing a computer readable financial institution database configured to store financial account data for at least one financial account of at least one user at a financial institution;
providing a financial institution computer processor coupled to the financial institution database, with the financial institution computer processor being configured to:
updating and maintaining financial account records stored in said financial institution database for the at least one financial account of the at least one user at the financial institution;
updating and maintaining at least one overdraft account linked to the at least one financial account of the at least one user at the financial institution;
receiving information establishing an occurrence of one of a selected plurality of adverse events that has been experienced by the user; and
based upon the receipt of the experience by the user of the occurrence of one of a selected plurality of adverse events, generating an adverse event occurrence signal;
providing a computer readable debt protection program database configured to store debt protection account data for the at least one financial account of the least one user at the financial institution; and
providing a debt protection program processor coupled to the debt protection program database, with the debt protection program processor configured for:
receiving information from the financial institution computer processor regarding the overdraft account linked to the at least one financial account of the at least one user at the financial institution;
receiving payment from the financial institution for the overdraft protection of the at least one overdraft account linked to the at least one financial account of the at least one user at the financial institution;
receiving the adverse event occurrence signal from the financial institution computer processor regarding the experience by the user of the occurrence of one of a selected plurality of adverse events; and
in response to receipt of the event occurrence signal from the financial institution computer processor, sending at least one payment to the financial institution to be credited to the at least one overdraft account linked to the at least one financial account of the at least one user at the financial institution 13. The method of providing overdraft protection for financial accounts of claim 12, wherein an overdraft of the at least one financial account of the user occurred before the financial institution received information establishing an occurrence of the adverse event by the user.

14. The method of providing overdraft protection for financial accounts of claim 13, further comprising the at least one payment to the financial institution to be credited to the at least one overdraft account is equal to one of the overdraft of the at least one financial account and the overdraft of the at least one financial account plus an overdraft fee plus interest on both the overdraft and the overdraft fee.

15. The method of providing overdraft protection for financial accounts of claim 12, wherein the information establishing an occurrence of one of a selected plurality of adverse events that has been experienced by the user is provided by the user.

16. The method of providing overdraft protection for financial accounts of claim 12, further comprising the at least one payment to the financial institution to be credited to the at least one overdraft account not exceed a predetermined amount.

17. The method of providing overdraft protection for financial accounts of claim 16, wherein the predetermined amount is five hundred dollars.

18. The method of providing overdraft protection for financial accounts of claim 16, wherein the at least one payment is based on a monthly schedule.

19. The method of providing overdraft protection for financial accounts of claim 12, wherein the one of the selected plurality of adverse events is one of a group consisting of: involuntary loss of job, death, and qualified disability of the user.

20. The method of providing overdraft protection for financial accounts of claim 19, the information establishing an occurrence of one of a selected plurality of adverse events includes a verification of the event.

21. The method of providing overdraft protection for financial accounts of claim 20, wherein the verification of the event is provided to one of the financial institution and a third party administrator of the system.

22. The method of providing overdraft protection for financial accounts of claim 12, wherein the financial account is one of a checking account, a debit card account, and a savings account.

23. A system of providing overdraft protection for financial accounts, the system comprising:
a computer readable financial institution database configured to store financial account data for at least one financial account of at least one user at a financial institution;
a financial institution computer processor coupled to the financial institution database, with the financial institution computer processor being configured to:
update and maintain financial account records stored in said financial institution database for the at least one financial account of the at least one user at the financial institution;
update and maintain at least one overdraft account linked to the at least one financial account of the at least one user at the financial institution;
receive information from the user establishing an occurrence of one of a selected plurality of adverse events that has been experienced by the user, including a verification of the event; and
based upon the receipt of the experience by the user of the occurrence of one of a selected plurality of adverse events, generating an adverse event occurrence signal;
a computer readable debt protection program database configured to store debt protection account data for the at least one financial account of the at least one user at the financial institution; and
a debt protection program processor coupled to the debt protection program database, with the debt protection program processor being configured to:

receive information from the financial institution computer processor regarding the overdraft account linked to the at least one financial account of the at least one user at the financial institution;

receive payment from the financial institution for the overdraft protection of the at least one overdraft account linked to the at least one financial account of the at least one user at the financial institution;

receive the adverse event occurrence signal from the financial institution computer processor regarding the experience by the user of the occurrence of one of a selected plurality of adverse events; and in response to receipt of the event occurrence signal from the financial institution computer processor, sending at least one payment to the financial institution to be credited to the at least one overdraft account linked to the at least one financial account of the at least one user at the financial institution.

24. The system of providing overdraft protection for financial accounts of claim 23, further comprising the at least one payment to the financial institution to be credited to the at least one overdraft account not exceed a predetermined amount.

25. The system of providing overdraft protection for financial accounts of claim 24, wherein the predetermined amount is five hundred dollars.

26. The system of providing overdraft protection for financial accounts of claim 24, wherein the at least one payment is based on a monthly schedule.

27. The system of providing overdraft protection for financial accounts of claim 23, wherein an overdraft of the at least one financial account of the user occurred before the financial institution received information establishing an occurrence of the adverse event by the user.

28. The system of providing overdraft protection for financial accounts of claim 27, further comprising the at least one payment to the financial institution to be credited to the at least one overdraft account is equal to one of an overdraft of the at least one financial account and an overdraft of the at least one financial account plus an overdraft fee plus interest on both the overdraft and the overdraft fee.

29. The system of providing overdraft protection for financial accounts of claim 23, wherein the one of the selected plurality of adverse events is one of a group consisting of: involuntary loss o job, death, and qualified disability of the user.

30. The system of providing overdraft protection for financial accounts of claim 23, wherein the verification of the event is provided to one of the financial institution and a third party administrator of the system.

31. The system of providing overdraft protection for financial accounts of claim 23, wherein the financial account is one of a checking account, a debit card account, and a savings account.

* * * * *